(12) United States Patent
Kamath et al.

(10) Patent No.: US 11,561,916 B2
(45) Date of Patent: Jan. 24, 2023

(54) PROCESSING TASK DEPLOYMENT IN ADAPTER DEVICES AND ACCELERATORS

(71) Applicant: HEWLETT PACKARD ENTERPRISE DEVELOPMENT LP, Houston, TX (US)

(72) Inventors: Harish Bantwal Kamath, Bengalooru (IN); Michael Lee Witkowski, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/741,684

(22) Filed: Jan. 13, 2020

(65) Prior Publication Data

US 2021/0216484 A1   Jul. 15, 2021

(51) Int. Cl.
*G06F 13/38* (2006.01)
*H04L 12/02* (2006.01)
*G06F 13/42* (2006.01)
*H04L 49/90* (2022.01)
(Continued)

(52) U.S. Cl.
CPC .......... *G06F 13/385* (2013.01); *G06F 13/102* (2013.01); *G06F 13/4282* (2013.01); *H04L 12/02* (2013.01); *H04L 49/9068* (2013.01); *H04L 63/0428* (2013.01); *G06F 2213/3808* (2013.01)

(58) Field of Classification Search
None
See application file for complete search history.

(56) References Cited

U.S. PATENT DOCUMENTS

| | | | | |
|---|---|---|---|---|
| 8,755,268 B2* | 6/2014 | Abderrazag | ........ | G06F 11/2007 370/221 |
| 9,014,054 B2* | 4/2015 | Dunbar | ................... | H04L 45/66 370/255 |
| 9,282,384 B1* | 3/2016 | Graves | ............... | H04Q 11/0005 |

(Continued)

FOREIGN PATENT DOCUMENTS

CN          1992610 A       7/2007

OTHER PUBLICATIONS

Abou-Gabal et al., "An Architecture for a Hardware Implementation of the OSPF Protocol", Research Gate, Jan. 2004, 9 pages.

(Continued)

*Primary Examiner* — Henry Tsai
*Assistant Examiner* — Christopher A Bartels
(74) *Attorney, Agent, or Firm* — Jones Robb PLLC

(57) ABSTRACT

Example approaches for processing task deployment in adapter devices and accelerators, are described. In an example, a service request is received by an adapter device. The service request is indicative of a service associated with a virtual multi-layer network switch. An accelerator may be integrated to the adapter device or coupled to the adapter device. A set of processing tasks associated with the service is identified based on the service request. A processing task instance corresponding to at least one of the set of processing tasks is deployed in one of the adapter device and the accelerator, based on predefined configuration information. The predefined configuration information includes policies for executing each of the set processing tasks in one of the adapter device and the accelerator.

20 Claims, 7 Drawing Sheets

(51) Int. Cl.
  *H04L 9/40* (2022.01)
  *G06F 13/10* (2006.01)

(56) References Cited

U.S. PATENT DOCUMENTS

| | | | |
|---|---|---|---|
| 9,600,429 B2 | 3/2017 | Pope | |
| 2006/0123204 A1* | 6/2006 | Brown | G06F 9/5077 |
| | | | 711/153 |
| 2010/0103837 A1* | 4/2010 | Jungck | H04L 63/0227 |
| | | | 370/252 |
| 2012/0078772 A1* | 3/2012 | Booth | G06Q 40/04 |
| | | | 705/37 |
| 2012/0147738 A1* | 6/2012 | Abderrazag | G06F 11/2005 |
| | | | 370/221 |
| 2013/0097600 A1* | 4/2013 | Cardona | G06F 9/45558 |
| | | | 718/1 |
| 2013/0205376 A1* | 8/2013 | Narasimha | H04L 9/3247 |
| | | | 726/6 |
| 2014/0304543 A1* | 10/2014 | Ilyas | G06F 1/12 |
| | | | 713/401 |
| 2015/0370700 A1* | 12/2015 | Sabol | G06F 3/0679 |
| | | | 711/103 |
| 2016/0330075 A1* | 11/2016 | Tiwari | H04L 29/08072 |
| 2016/0337426 A1* | 11/2016 | Shribman | H04L 65/608 |
| 2016/0343093 A1* | 11/2016 | Riland | G06Q 10/04 |
| 2016/0380886 A1* | 12/2016 | Blair | H04L 45/50 |
| | | | 398/49 |
| 2017/0063808 A1 | 3/2017 | Manapragada et al. | |
| 2017/0187846 A1* | 6/2017 | Shalev | G06F 15/17331 |
| 2017/0212784 A1* | 7/2017 | Johnsen | H04L 49/358 |
| 2017/0272316 A1* | 9/2017 | Johnson | H04L 67/141 |
| 2019/0102346 A1* | 4/2019 | Wang | G06F 16/906 |
| 2020/0073840 A1* | 3/2020 | Mekad | G06F 9/4411 |
| 2020/0336386 A1* | 10/2020 | Wong | H04L 45/122 |
| 2020/0389296 A1* | 12/2020 | Ganguli | G11C 8/12 |
| 2021/0117360 A1* | 4/2021 | Kutch | G06F 13/4027 |
| 2021/0232528 A1* | 7/2021 | Kutch | G06F 9/44505 |

OTHER PUBLICATIONS

Dundjerski et al., "GPU-based paralelization of the BGP protocol", 2011 19thTelecommunications Forum (TELFOR) Proceedings of Papers, Nov. 22-24, 2011.

Kalia et al., "Raising the Bar for Using GPUs in Software Packet Processing", Proceedings of the 12th USENIX Symposium on Networked Systems Design and Implementation (NSDI '15), May 4-6, 2015, pp. 409-423.

Mukerjee et al., "Packet Processing on the GPU", Semantic Scholar, 2012, pp. 1-9.

Zeng et al., "Fast Reroute and Multipath Routing Extensions to the NetFPGA Reference Router", Semantic Scholar, 2009, 3 pages.

Cypress Semiconductor Corporation, "Smart I/O™—PSoC® Creator™ Component Datasheet," Apr. 3, 2017, pp. 1-41, Document No. 002-18205 Rev. *A.

Kevin Deierling, "Why You Need a SmartNIC and Smart NIC Use Cases," Sep. 11, 2018, pp. 1-5, Mellanox, Retrieved from the Internet on Nov. 20, 2019 at URL: <blog.mellanox.com/2018/09/why-you-need-smart-nic-use-cases/>.

Mellanox Technologies, "BlueField® SmartNIC for Ethernet," Product Brief, 2019, pp. 1-3, Rev. 2.6, Retrieved from the Internet on Oct. 31, 2019 at URL: <mellanox.com/related-docs/prod_adapter_cards/PB_BlueField_Smart_NIC.pdf>.

Mellanox Technologies, "Mellanox BlueField™ SmartNIC," 2018. pp. 1-3. Sunnyvale, CA, USA.

Mellanox Technologies, "Mellanox Innova™-2 Flex Open Programmable SmartNIC," 2018, pp. 1-3, Sunnyvale, CA, USA.

* cited by examiner

PROCESSING TASK DEPLOYMENT IN ADAPTER DEVICES AND ACCELERATORS

BACKGROUND

Computing devices may be coupled to an adapter that provides additional functionality. For example, a host computing device, such as a server, may be coupled to a network adapter, such as, a network interface card (NIC) that allows the host device to communicate with remote devices via a communication network, such as an Ethernet network. In some examples, adapters may include components to provide processing functionality to the host server. In an example, an adapter device may be referred to as a "smart adapter" which is configured to couple to a host device, and to provide processing functionality to the host device. Some smart adapters may provide multiple processing functions or services to the host device.

Adapter devices, such as smart Network Interface Cards (NICs) or Smart I/O adapters may be coupled to host devices through a bus interface, such as a serial expansion bus, for example, Peripheral Component Interconnect Express (PCIe. In some cases, the bus interface may be implemented in a physical bus slot or receptacle of the host device. The adapter device may provide several functionalities or services related to network connectivity, storage, video/graphics acceleration, cryptographic processing, telemetry, system management, packet processing, etc., to the host device.

BRIEF DESCRIPTION OF DRAWINGS

One or more example implementations are described with respect to the following figures.

DETAILED DESCRIPTION

Figure 1:
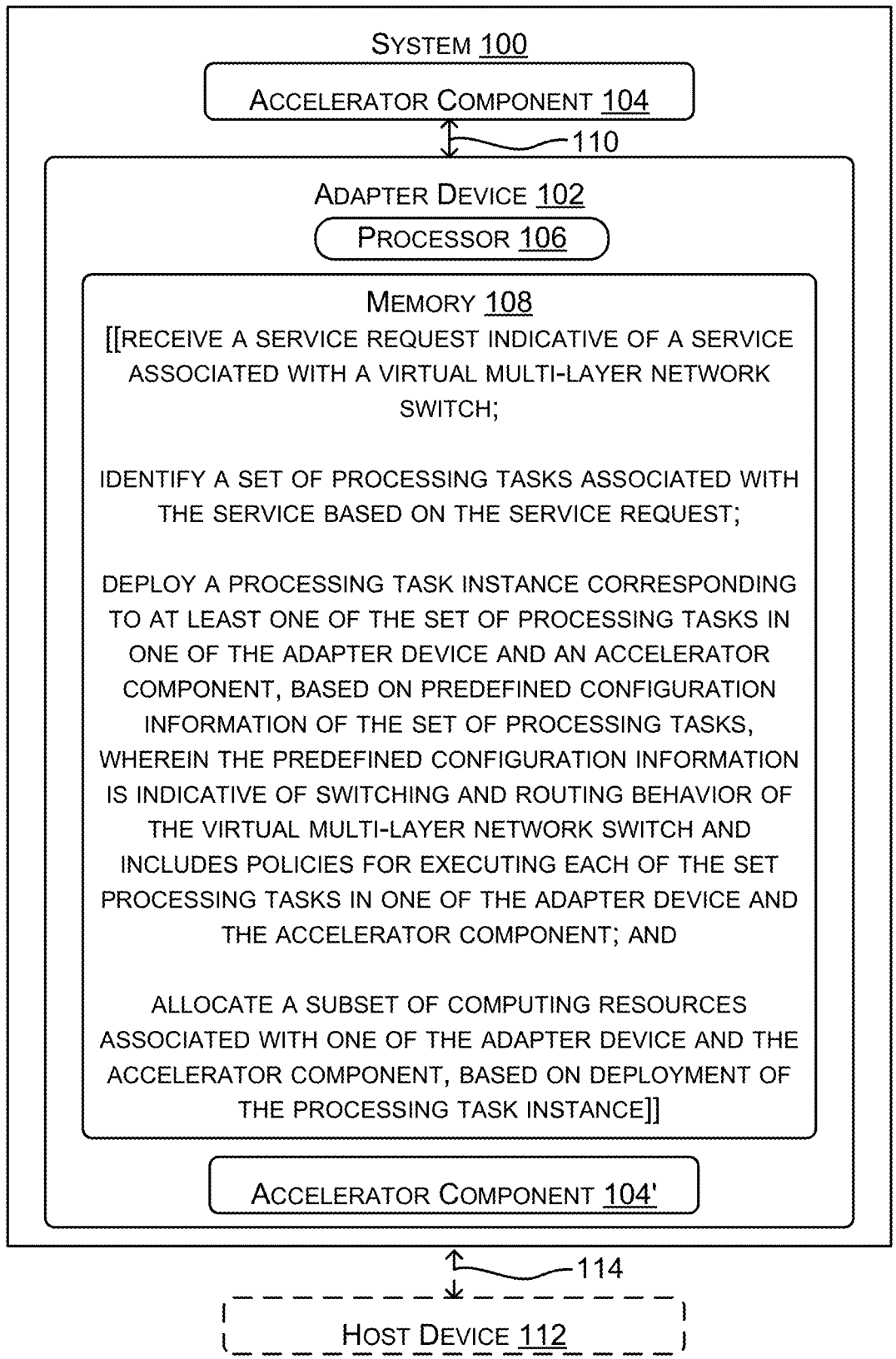
FIG. 1 illustrates a system for deployment of processing tasks, in accordance with an example.

An adapter device may include computing resources such as, processor(s), memory, in-built accelerators, and interfaces to attach storage or external accelerator components to the adapter device. In an example, an accelerator component may be in-built or integrated in the adapter device. In some examples, the adapter device may also include a bus interface, such as PCIe, through which accelerator components, such as Graphical Processing Unit (GPU) devices or Field Programmable Gated Array (FPGA) devices or Application Specific Integrated Circuit (ASIC) devices may be coupled to the adapter device. The bus interface of the adapter device may be implemented as a physical slot/receptacle in the adapter device. An accelerator component is a hardware device that functions to enhance the overall speed and performance of another device. The accelerator component works by performing functions, such as graphics rendering, encryption and decryption, etc., faster than the central processing unit (CPU) of the host device.

In an example, the host device may request different functions or services associated with switching/routing, security, and storage to be performed by the computing resources of the adapter device. Thus, processing of certain functions or services may be transferred from the host device to the adapter device, which may be referred to as offloading of functions or services to the adapter device.

Since, the adapter device enables offloading of different functions off from the processor(s) of the host device, Central Processing Unit (CPU) of the host device may be utilized for other functions, such as hosting virtual machines, hypervisors, and other applications. This may improve the processor performance of the host device. However, with increasing use of server virtualization via virtual machines (VMs) or container-based solutions, load on the processors of the host device increases for supporting complex network switching/routing or storage operations for connectivity between different virtual computing entities in a virtual network environment. Even with such complex switching/routing operations being offloaded to the adapter device, the computing resources of the adapter device may be overloaded which may adversely affect the performance of the adapter device. Thus, processing of such switching/routing operations may also be interrupted or may result in poor performance.

The present disclosure describes approaches in which some of the processing tasks associated with a service may be selectively deployed for execution in an adapter device or in an accelerator component integrated with or coupled to the adapter device, depending on predefined configuration information of the processing tasks. Thus, the load of multiple processing tasks, which includes complex network switching and routing operations, may be distributed between the adapter device and the accelerator component(s), while the host device is offloaded. Since, some processing operations, depending on their configuration information, are handled by the accelerator component(s) integrated with or coupled to the adapter device, processor performance of the adapter device and processor performance of the host device may be enhanced with greater flexibility.

The present disclosure describes example implementations of deployment of processing tasks offloaded from a host device to an adapter device and accelerator component(s). In an example, an adapter device is coupled to the host device through a first bus interface of the host device. An accelerator component may be integrated or in-built in the adapter device. In another example, the adapter device may include a second bus interface through which an accelerator component is coupled to the adapter device. In an example, the first and second bus interfaces may be PCIe slots present in the host device and adapter device, respectively.

In an example, a service request is received by the adapter device. The service request is indicative of a service associated with a virtual multi-layer network switch to be provided to the host device. The virtual multi-layer network switch has capabilities to operate as a software-based network switch running as a switching stack for hardware virtualization environments. The virtual multi-layer network switch, also referred to as the network switch, can also support multiple protocols and standards used in computer networks. The network switch can perform layer 2 and layer 3 switching and routing functions. Each functionality or application of the network switch may be referred to as a service associated with the network switch. In an example, the service includes at least one of data packet processing and encryption, error checking, dynamic routing, link aggregation, multicast group management, network management, deep packet inspection, and telemetry analysis. In an example, the service request may be received from the host device. In another example, the service request may be received from another appliance, such as a server, a network switch/router, a virtual machine, software-defined infrastructure management platform, etc., which is connected to the network to which the adapter device is connected.

The adapter device identifies a set of processing tasks associated with the service based on the service request. A processing task refers to an operation or a series of operations to be performed for implementing the service, or a portion thereof, indicated in the service request. Thus, for providing a service to the host device multiple processing tasks may be executed. A single copy of a processing task which is running or is under execution, is referred to as a processing task instance. Each processing task instance is to execute a specific processing task from the set of processing tasks associated with the service. Each of the set of processing tasks may have a predefined configuration information. The predefined configuration information is indicative of switching and routing behavior of the virtual multi-layer network switch and includes policies for executing each of the set processing tasks in one of the adapter device and the accelerator component. In response to identifying the set of processing tasks, a processing task instance corresponding to at least one of the set of processing tasks is deployed in one of the adapter device and the accelerator component, based on the predefined configuration information of the set of processing tasks.

Thus, a single processing task instance or a group of processing task instances corresponding to different processing tasks may be deployed for execution in the adapter device or in the accelerator component(s), based on their predefined configuration information. This enables efficient distribution of the load for processing the processing tasks associated with the service and thereby facilitates in enhanced performance of the adapter device and the host device. This may also provide uninterrupted and smooth processing of the operations for providing the service. The distributed deployment of processing task instances in one of the adapter device and the accelerator component(s) prevents overloading of the adapter device, while effectively offloading the host device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for deployment of processing tasks, in accordance with an example. In some examples, the system 100 may be an adapter system. The system 100 includes an adapter device 102 and accelerator component(s) 104 and 104', as shown in FIG. 1.

The adapter device 102 includes a processor 106 and a memory 108. The processor 106 may include a microprocessor, a microcontroller, a processor module or subsystem, a programmable integrated circuit, a programmable gate array, multiple processors, a microprocessor including multiple processing cores, or another control or computing device. The memory 108 stores instructions executable by the processor 106. The memory 108 may include any computer-readable medium known in the art including, for example, volatile memory (e.g., RAM), and/or non-volatile memory (e.g., EPROM, flash memory, etc.). Further, in an example, the adapter device 102 may include interfaces (not shown), such as a network interface that provides connectivity to a communication network, such as an Ethernet network, a local wireless network, a cellular telephone network, and so forth.

As shown in FIG. 1, the accelerator component 104 is external to the adapter device 102. The adapter device 102 includes a bus interface 110 to couple the accelerator component 104 to the adapter device 102. The bus interface 110 may provide the accelerator component 104 with electrical power from the adapter device 102 and may provide data communication to/from the adapter device 102. For example, in some implementations, the bus interface 110 may provide a local computer bus (e.g., a Peripheral Component Interconnect (PCI) bus). Further, in some implementations, the bus interface 110 may be implemented in a physical bus slot or receptacle of the adapter device 102. The accelerator component 104' is in-built and integrated with the adapter device 102. In an example, the accelerator component 104' may be mounted within the housing of the adapter device 102. Although in FIG. 1, the adapter device 102 is shown to have both in-built and externally coupled accelerator components, in an example, an accelerator component may be either integrated with the adapter device or coupled to the adapter device through a bus interface.

As shown in FIG. 1, the adapter device 102 is coupled to a host device 112 through a bus interface 114 of the host device 112. The bus interface 114 may be referred to as a first bus interface and the bus interface 110 may be referred to as a second bus interface. In some examples, the host device 112 may be a computing device (e.g., a server, an appliance, etc.) that includes a memory and a processor similar to the memory 108 and processor 106 of the adapter device 102. The host device 112 may include the bus interface 114 to couple to the adapter device 102. The bus interface 114 may provide the adapter device 102 with electrical power from the host device 112 and may provide data communication to/from the system 100. For example, in some implementations, the bus interface 114 may provide an expansion bus (e.g., a Peripheral Component Interconnect (PCI) bus). Further, in some examples, the bus interface 114 may be implemented in a physical bus slot or receptacle of the host device 112.

In an example, when coupled to the host device 112, the adapter device 102 may provide one or more services. As used herein, a "service" refers to a particular processing service or function provided by an adapter device to a coupled host device. For example, the adapter device 102 may provide the host device 112 with multiple services, such as network connectivity, storage connectivity, video/graphics acceleration, cryptographic processing, telemetry, system management, packet processing, and so forth.

In an example, the instructions stored in the memory 108 of the adapter device 102, when executed by the processor 106 causes the processor 106 to receive a service request. In an example, the service request may be received from the host device 112. In another example, the service request may be received from another appliance, such as a server, a network switch/router, a virtual machine, etc., which is connected to a network (shown in FIG. 2) to which the adapter device 102 is connected. Thus, the service request may be received from the host device, such as the host device 112, to which the adapter device is coupled or may be received over the network. The service request is indicative of a service associated with a virtual multi-layer network switch, to be provided to the host device. In an example, the service request may indicate that the virtual multi-layer network switch is to be operated as a layer 3 router along with network configuration of the same. In an example, the service request and its network configuration may be defined by a network administrator depending on the physical and virtual network infrastructure. In an example, the service includes at least one of data packet processing and encryption, error checking, dynamic routing, link aggregation, multicast group management, network management, deep packet inspection, and telemetry analysis.

Based on the service request, the instructions stored in the memory 108 of the adapter device 102, when executed by the processor 106 causes the processor 106 to identify a set of processing tasks associated with the service. In an example, the set of processing tasks may include processing operations for one of data packet processing and encryption based on Internet Protocol Security (IPSec), error-checking based on Transmission Control Protocol (TCP) and Internet Protocol version 4 (IPv4) checksum, dynamic routing based on Border Gateway Protocol (BGP) and Open Shortest Path First (OSPF), link aggregation based on Link Aggregation Control Protocol (LACP), multicast group management based on Internet Group Management Protocol (IGMP) and Protocol Independent Multicast (PIM), network management based on Simple Network Management Protocol (SNMP), Virtual Local Area Network (VLAN) tagging and un-tagging, and a combination thereof.

Each of the processing tasks has a predefined configuration information. Depending on the processing requirements of the processing tasks their configuration information may be defined. Thus, the predefined configuration information is indicative of switching and routing behavior of the virtual multi-layer network switch. In an example, the configuration information may be defined or modified by a network administrator. The configuration information may specify a hardware component or device which is suited for execution of the processing task. In an example, the configuration information associated with the processing task of link aggregation may include policies that define that link aggregation based on LACP is to be executed in the accelerator component(s), whereas, the configuration information associated with the processing task of error reporting may define that error reporting based on Internet Control Message Protocol (ICMP) is to be executed in the adapter device. Thus, the predefined configuration information includes policies for executing each of the set processing tasks in one of the adapter device and the accelerator component. In an example, the predefined configuration information may also include policies that define whether one of an external accelerator component, such as the accelerator component 104, and an in-built accelerator component, such as the accelerator component 104', is to be used for executing one or a group of processing tasks. Thus, a processing task or more than one processing tasks may be deployed in the accelerator component 104' or the accelerator component 104, based on the configuration information.

The instructions stored in the memory 108 of the adapter device 102, when executed by the processor 106 cause the processor to deploy a processing task instance corresponding to at least one of the set of processing tasks in one of the adapter device 102 and the accelerator component 104 or 104', based on predefined configuration information of the set of processing tasks. This distributed deployment of one processing task instance or more than one processing task instance in one of the adapter device 102 and the accelerator component(s) 104 or 104' prevents overloading of the adapter device 102, while effectively offloading the host device 112.

Figure 2:
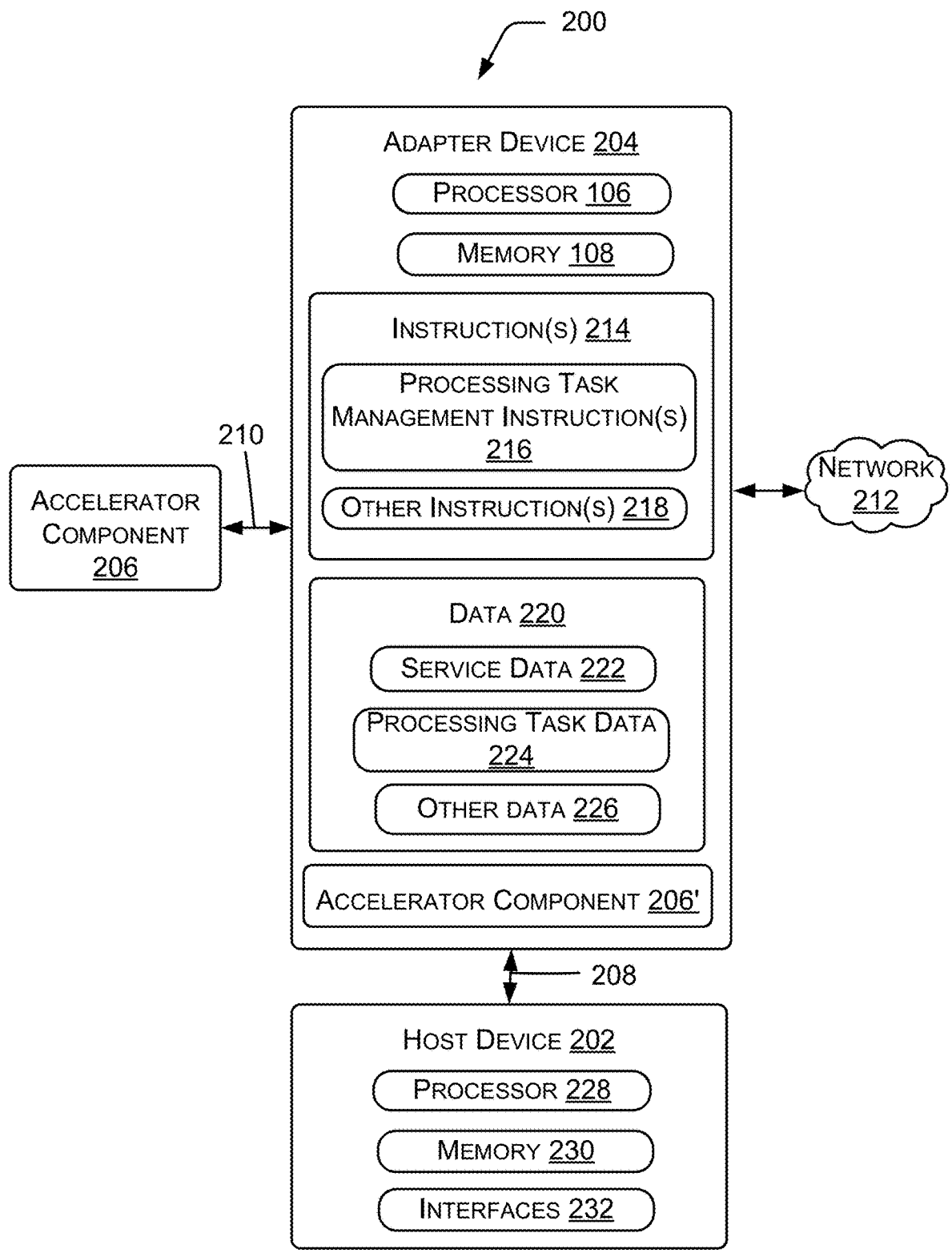
FIG. 2 illustrates a computing environment for deployment of processing tasks, in accordance with an example.

FIG. 2 illustrates a computing environment 200 for deployment of processing tasks, in accordance with an example. The computing environment 200 includes a host device 202, an adapter device 204 coupled to the host device 202, an accelerator component 206 coupled to the adapter device 204, and an accelerator component 206' integrated with the adapter device 204. Thus, the accelerator components 206 or 206' may be one of integral to the adapter device 204 or externally coupled to the adapter device 204. Example of the host device 202 includes a host server or an appliance, the adapter device 204 may be a smart Network Interface Card (NIC) adapter, and the accelerator components 206 and 206' may be a Graphics Processing Unit (GPU) based accelerator component, a Field Programmable Gated Array (FPGA) based accelerator component, and an Application Specific Integrated Circuit (ASIC) based accelerator component.

As shown in FIG. 2, the adapter device 204 may be coupled to the host device 202 through a first bus interface 208 of the host device 202. The accelerator component 206 may be coupled to the adapter device 204 through a second bus interface 210. The first and second bus interfaces 208 and 210 are similar to the bus interface 114 and the bus interface 110, as illustrated in FIG. 1. The first and second bus interfaces 208 and 210 may be implemented as PCIe root ports of the host device 202 and PCIe root ports of the adapter device 204, respectively. As shown in FIG. 2, the adapter device 204 may enable the host device 202 to connect to a network 212, such as the Internet, through an ethernet connection.

As shown in FIG. 2, the adapter device 204 includes the processor 106 coupled to the memory 108. The processor 106 may be implemented as microprocessors, microcomputers, microcontrollers, digital signal processors, central processing units, state machines, logic circuitries, and any devices that manipulate signals based on operational instructions. Among other capabilities, the processor 106 is configured to fetch and execute computer-readable instructions stored in the memory 108. The computer-readable instructions, also referred to as instructions, includes instructions 214. The instructions 214 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing execution of the function or the instructions enabling execution of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and custom, may also be included.

The memory 108 may include any computer-readable medium known in the art including, for example, volatile memory (e.g., RAM), and/or non-volatile memory (e.g., EPROM, flash memory, etc.). The instruction(s) 214 include processing task management instruction(s) 216 which corresponds to instructions stored on a computer-readable medium and executable by a processor to enable processing tasks to be deployed in the adapter device 204 and the accelerator component 206 or 206' to provide a service to the host device 202. The instruction(s) 214 also comprise other instruction(s) 218 that supplement applications on the adapter device 204.

Data 220 serves, amongst other things, as a repository for storing data that may be fetched, processed, received, or generated by the instruction(s) 214. The data 220 includes service data 222 which stores information of the service requests received and processing task data 224 which stored information of the processing tasks associated with the services. The data 220 also comprises other data 226 that may be fetched, processed, received, or generated during execution of other instruction(s) 218. Further, the adapter device 204 may include other computing resources (not shown), such as a network interface, a field-programmable gate array (FPGA), and so forth.

Further, the host device 202 includes a processor 228 coupled to a memory 230. The processor 228 and the memory 230 may be similar to the processor 106 and the memory 108. Further, the host device may include interfaces 232, such as network interfaces.

In an example, the adapter device uses containers to provide the processing functions. The adapter device may include computing resources (e.g., processor, memory, storage, accelerators, etc.) that can execute multiple containers. As used herein, "container" refers to an isolated computing environment that is executed by an adapter device. In an example, the containers in an adapter device may include a composer container and any number of service containers. In an example, the composer container may receive a service request to compose a specific service. In response to the received request, the composer container may determine, whether one of the adapter device and the accelerator component has computing resources to support a service container to provide the requested service. Based on the determination, the composer container may allocate a portion of the computing resources of one of the adapter device and the accelerator component(s) to deploy the service container. Based on predefined configuration information of processing tasks associated with the requested service, the composer container may further deploy processing task instances in one of the adapter device and the accelerator component(s). Further, the composer container may track and allocate computing resources of one of the adapter device and the accelerator component(s) to multiple processing task instances. Such distributed deployment of the processing task instances may allow the host to be effectively offloaded without overloading the adapter device and the accelerator component(s), consequently improving performance and flexibility of the host device and the adapter device. Further, details in respect of implementation of the containerized applications is explained with reference to FIG. 5.

In operation, consider that a user interacts with the host device 202 to specify a particular service associated with a virtual multi-layer network switch. In response, the host device 202 may generate a service request which is communicated to the adapter device 204 via the first bus interface 208 of the host device 202. In another example, the service request may be received by the adapter device 204 from another appliance, such as a server, a network switch/router, a virtual machine, a software-defined infrastructure management platform, etc., which is connected to the network to which the adapter device is connected. In an example, the service request may specify that the requested service is that of a layer 2 switch. The service request may also include other network infrastructure related information and network protocol-based information for implementation of the layer 2 switch. In some examples, the service request may be communicated at least in part using data formats such as JavaScript Object Notation (JSON), Extensible Markup Language (XML), Binary Encoded JSON (BEJ), and so forth. Examples of the service include at least one of data packet processing and encryption, error checking, dynamic routing, link aggregation, multicast group management, network management, deep packet inspection, and telemetry analysis.

Consider that the adapter device 204 receives the service request from the host device 202. In response to receiving the service request, the processing task management instruction(s) 216, when executed by the processor 106, cause the processor 106 to identify a set of processing tasks associated with the service based on the service request. Based on the information in service request, the processing task management instruction(s) 216 enables identification of the processing tasks to be performed for providing the service to the host device 202. In an example, in response to receiving the service request, the processing task management instruction(s) 216, may cause a service container to be deployed in the adapter device 204. The service container is configured to provide the service to the host device 202. In an example, each processing task instance corresponding to each of the processing tasks is managed by the service container. In another example, a containerized application instance may be deployed for each of the processing task instances.

Each of the processing tasks has a predefined configuration information. The predefined configuration information is indicative of switching and routing behavior of the virtual multi-layer network switch and includes policies executing each of the set processing tasks in one of the adapter device 204 and the accelerator components 206 or 206'. In an example, in the predefined configuration information, processing tasks which consume higher CPU cycles may be defined to be executed in the accelerator component 206. In an example, in the predefined configuration information, processing tasks which consume lower CPU cycles may be defined to be executed in the CPU cores of the adapter device 204. The predefined configuration information defines the policies for execution of the processing tasks, based on which deployment and execution of the processing task instances take place during offloading of functionalities of the virtual multi-layer network switch.

In an example, in response to identifying the processing tasks, the processing task management instruction(s) 216 when executed by the processor 106, cause the processor 106 to check whether a processing task instance corresponding to each of the processing tasks is to be executed in one of the adapter device's 204 processor 106, or the accelerator components 206 or 206', based on policies incorporated in the predefined configuration information. Each processing task instance is to enable execution of a specific processing task from the set of processing tasks associated with the service. Based on the checked compatibility, the processing task management instruction(s) 216 may enable selection of one of the adapter device's 204 processors 106, or the accelerator components 206 or 206' for deployment of the processing task instance.

In an example, in response to selecting the accelerator components 206 or 206' for deployment of the processing task instance, the processing task management instruction(s) 216 may cause one of the accelerator component 206 and the accelerator component 206' to be selected for deployment of the processing task instance, based on the predefined configuration information. Further, the processing task management instruction(s) 216 may cause computing resource requirements of the processing task instance to be determined, based on the predefined configuration information. In an example, the processing task management instruction(s) 216 may cause determination of a type and amount of hardware resources of the accelerator component 206 or 206' that would be required to implement the processing task instance (e.g., a memory space, a processing speed, and so forth). The processing task management instruction(s) 216 may also cause the processor 106 to determine the available resources of the accelerator component 206 or 206' (e.g., by subtracting previous allocations to existing processing task instances from the total amount(s) of resources of the accelerator component 206 or 206'). The processing task management instruction(s) 216 may also cause the processor 106 to determine whether the requirements of the processing task instance can be supported by the available resources of the accelerator component 206 or 206'. In some examples, the processing task management instruction(s) 216 may maintain stored data structures to track existing allocations of resources to processing task instances, total resources, and so forth.

In response to determining that the available computing resources of the accelerator component 206 or 206' cannot support the requirements of the processing task instance, the processing task management instruction(s) 216 may cause the processor 106 to raise an error message to indicate to the user that the processing task instance cannot be deployed on the accelerator component 206 or 206'. In response to determining that the available computing resources of the accelerator component 206 or 206' supports the computing resource requirements of the processing task instance, the processing task management instruction(s) 216 enables deployment of the processing task instance in the accelerator component 206 or 206'.

In an example, once a processing task instance associated with a particular processing task is previously deployed in the accelerator component 206 or 206', the previously deployed processing task instance may be subsequently used for executing the particular processing task in future, when a current processing task instance associated with the particular processing task is to be deployed in the accelerator component 206 or 206'. In another example, the processing task management instruction(s) 216 may cause the processor 106 to launch a separate processing task instance corresponding to the current processing task instance in the accelerator component 206 or 206'.

In this way, the processing task management instruction(s) 216 when executed by the processor 106, cause the processor 106 to deploy a processing task instance corresponding to at least one of the set of processing tasks in one of the adapter device 204 and the accelerator component(s) 206 or 206', based on predefined configuration information of the set of processing tasks. Thus, different processing tasks associated with the service may be executed in a distributed manner, either in the adapter device's 204 processor 106 or in the accelerator components 206 or 206'. Based on deployment of the processing task instances, the processing task management instruction(s) 216 may enable allocation of a subset of computing resources associated with one of the adapter device 204 and the accelerator component 206 or 206' to the processing task instance.

Figure 3:
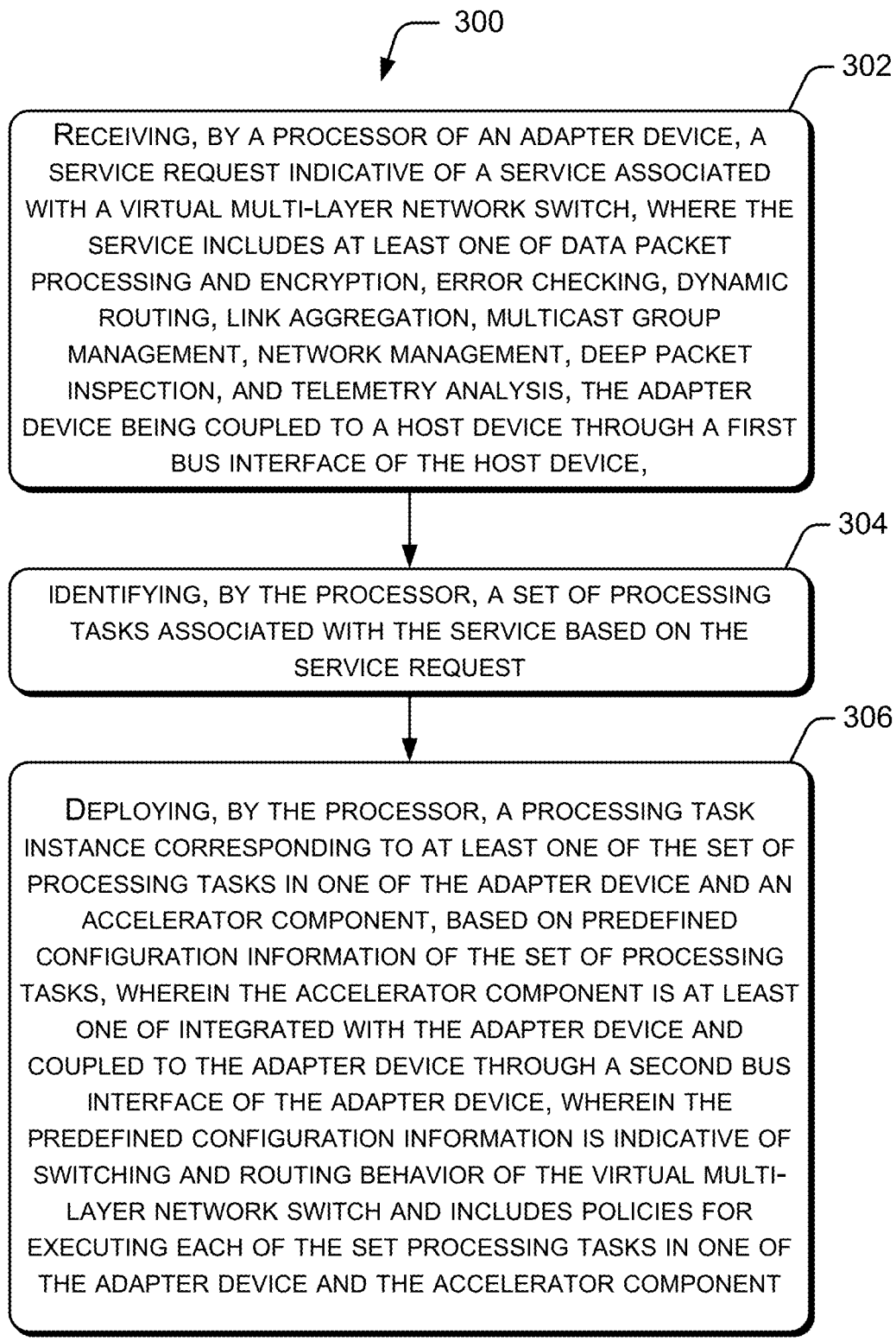
FIG. 3 illustrates a method for deployment of processing tasks, in accordance with an example.

FIG. 3 illustrates a method 300 for deployment of processing tasks, in accordance with an example. The method 300 can be implemented by processing resource(s) or computing device(s) through any suitable hardware, a non-transitory machine readable medium, or combination thereof. In an example, step(s) of the method 300 may be performed by execution of computer-readable instructions, such as the processing task management instruction(s) 216 which includes instructions stored on a medium and executable by a processing resource, such as the processor 106, of an adapter device, such as the adapter device 102 or 204. Further, although the method 300 is described in context of the aforementioned adapter device 102 or 204, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a service request is received by the adapter device. In an example, a user may interact with a host device to specify a particular service associated with a virtual multi-layer network switch. In response, the host device may generate a service request which is communicated to the adapter device. In another example, the service request may be received by the adapter device from another appliance, such as a server, a network switch/router, a virtual machine, a software-defined infrastructure management platform, etc., which is connected to the network to which the adapter device is connected. Thus, the service request may be received from the host device, such as the host device 112 or 202, to which the adapter device is coupled or may be received over the network. from a host device, such as the host device 112 or 202. The adapter device is coupled to the host device through a first bus interface, such as the bus interface 114 or 208 of the host device, such as the host device 112 or 202. In an example, the adapter device is coupled to a physical bus slot of the host device. In an example, the adapter device is coupled to the host device through a serial expansion bus, such as PCIe.

For the purposes of FIG. 3, consider that the adapter device receives the service request from the host device to which the adapter device is coupled. In an example, a user may interact with the host device to specify a particular service associated with a virtual multi-layer network switch. In response, the host device may generate a service request which is communicated to the adapter device via a first bus interface, such as the bus interface 114 or 208 of the host device. In an example, the service request may specify that the requested service is that of a layer 2 switch. The service request may also include other network infrastructure related information and network protocol-based information for implementation of the layer 2 switch. Thus, the service request is indicative of a service associated with a virtual multi-layer network switch to be provided to the host device. In some examples, the service request may be communicated at least in part using data formats such as JavaScript Object Notation (JSON), Extensible Markup Language (XML), Binary Encoded JSON (BEJ), and so forth. Examples of the service include one of data packet processing and encryption, error checking, dynamic routing, link aggregation, multicast group management, network management, deep packet inspection, telemetry analysis, and a combination thereof. In an example, an accelerator component, such as the accelerator component 104' or 206' may be in-built and integrated within the adapter device, such as the adapter device 102 or 204. In an example, the adapter device includes a second bus interface, such as the bus interface 110 or 210, through which an accelerator component, such as the accelerator component 104 or 206, is coupled to the adapter device. Examples of the accelerator component include one of Graphics Processing Unit (GPU) device, a Field Programmable Gated Array (FPGA) device, and an Application Specific integrated Circuit (ASIC) device.

In response to receiving the service request, a set of processing tasks associated with the service is identified based on the service request, at block 304. A processing task refers to an operation or a series of operations to be performed for implementing the service, or a portion thereof, indicated in the service request. A processing task is executed by running a processing task instance. Thus, each processing task instance is to execute a specific processing task from the set of processing tasks associated with the service.

At block 306, a processing task instance corresponding to at least one of the set of processing tasks is deployed in one of the adapter device and the accelerator component, based on predefined configuration information of each of the set of processing tasks. The predefined configuration information is indicative of switching and routing behavior of the virtual multi-layer network switch and includes policies for executing each of the set processing tasks in one of the adapter device and the accelerator component. Thus, the present disclosure enables execution of different processing tasks associated with a service in distributed manner between the adapter device and the accelerator component, thereby enabling enhanced performance of the adapter device while efficiently offloading the host device.

Figure 4A:
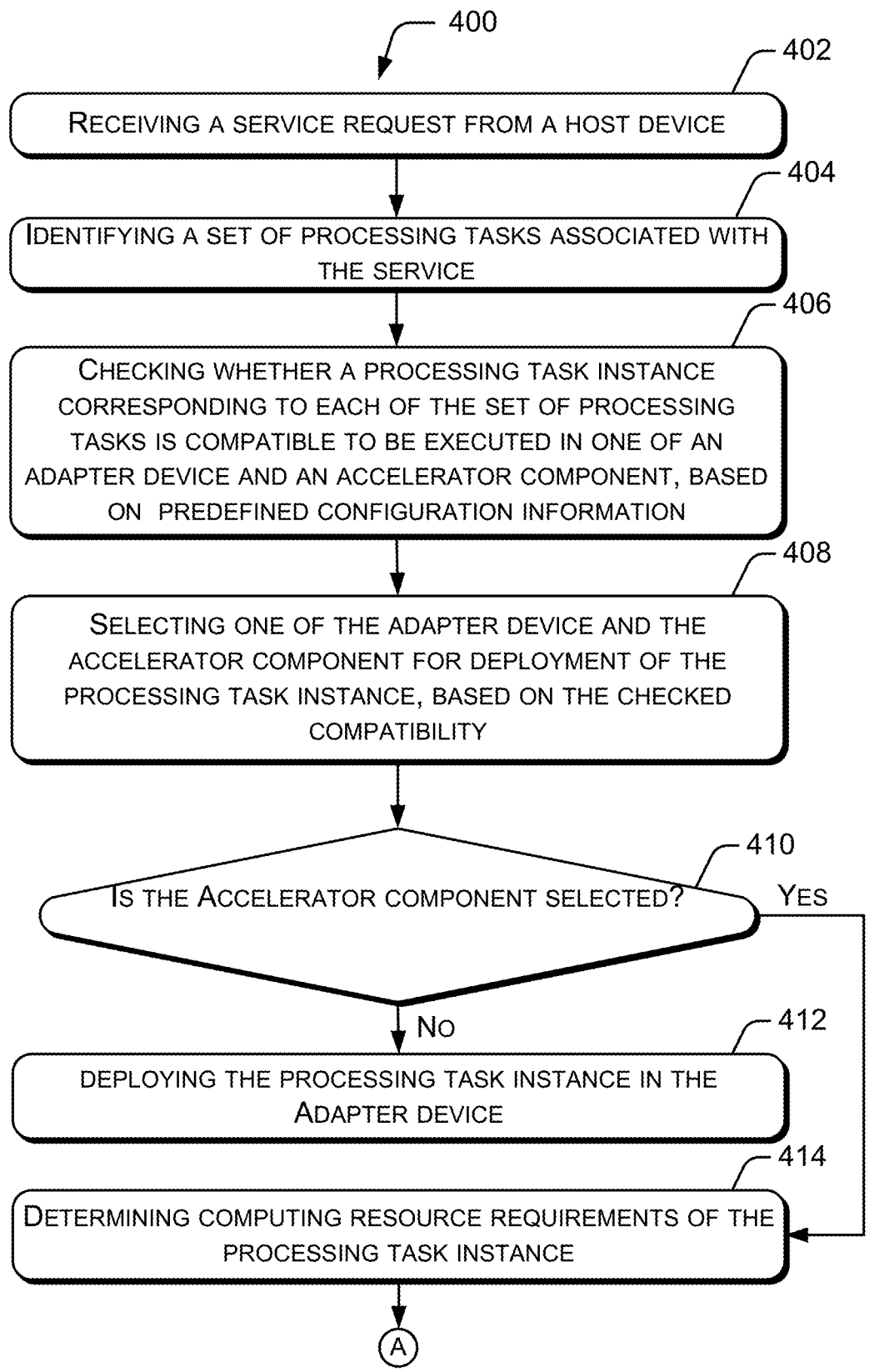
FIGS. 4A and 4B illustrate a method for deployment of processing tasks, in accordance with an example.
Figure 4B:
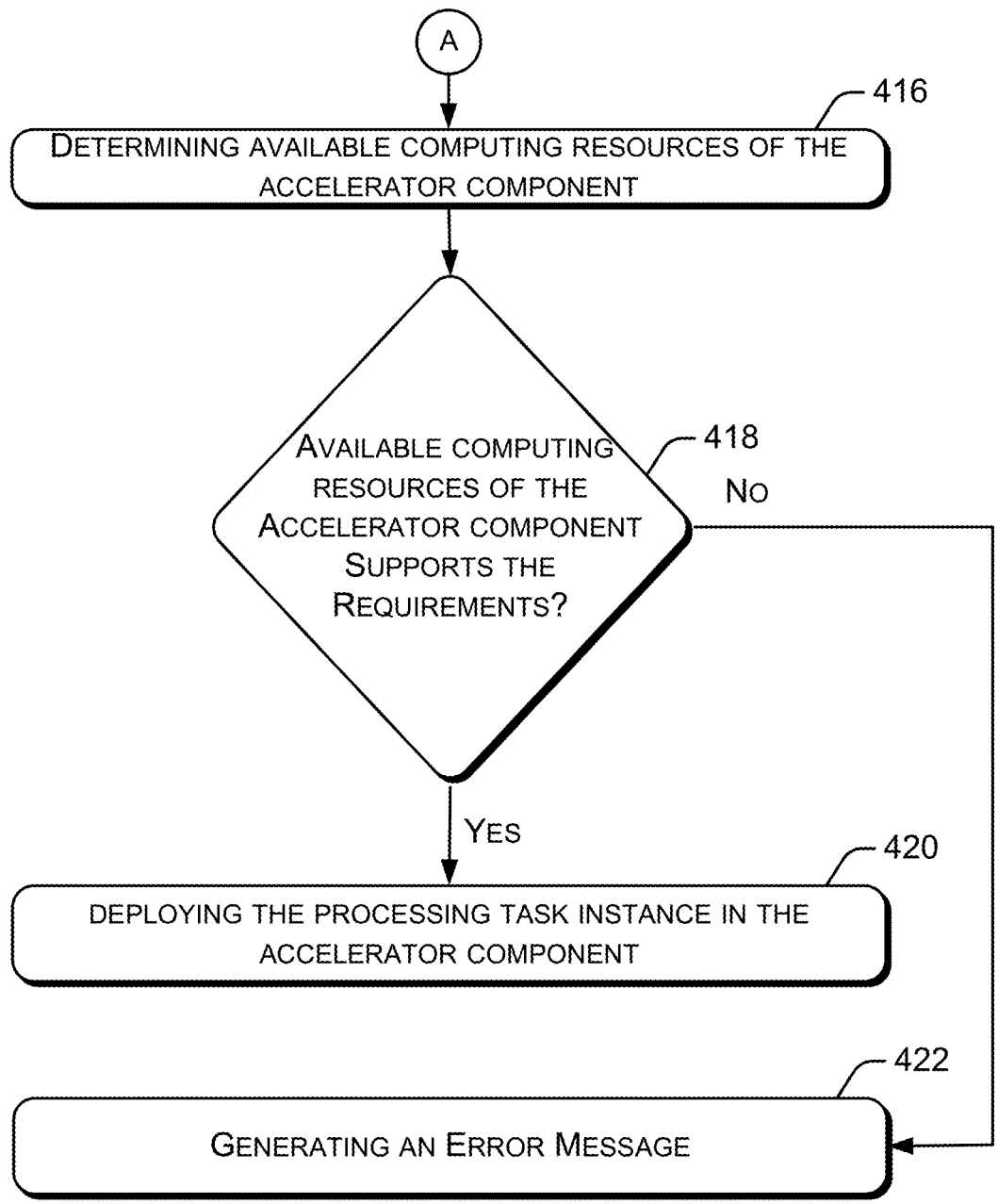

FIGS. 4A and 4B illustrate a method 400 for deployment of processing tasks, in accordance with an example. The method 400 can be implemented by processing resource(s) or computing device(s) through any suitable hardware, a non-transitory machine readable medium, or combination thereof. In an example, step(s) of the method 400 may be performed by execution of computer-readable instructions, such as the processing task management instruction(s) 216 which includes instructions stored on a medium and executable by a processing resource, such as the processor 106, of an adapter device, such as the adapter device 102 or 204. Further, although the method 300 is described in context of the aforementioned adapter device 102 or 204, other suitable systems may be used for execution of the method 300. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4A, at block 402, a service request is received by the adapter device, such as the adapter device 102 or 204. In an example, a composer container in the adapter device, may receive a request to deploy a service container, from a host device or from an appliance connected to the network to which the adapter device is connected. For example, referring to FIG. 5, a host device 502 may include a composer application 504, a composer driver 506, and a PCI bus driver 508. Further, an adapter device 510 may include a composer container 512, multiple service containers 514A-514F (generally referred to as service container(s) 514), and an accelerator component 516' integrated with the adapter device 510. Further, an accelerator component 516 is externally coupled to the adapter device 510. In an example, processing task instances associated with each of the service containers may be deployed in one of the processors of the adapter device 510, an accelerator component 516' integrated with the adapter device 510, and an accelerator component 516 externally coupled to the adapter device 510. Consider that a user interacts with the composer application 504 to specify a particular service and/or service container. In response, the composer application 504 may generate a service request to deploy a service container 514 to provide the requested service. In an example, the service request may be communicated to the composer container 512 of the adapter device 510 via the composer driver 506 and the PCI bus driver 508 of the host device 502. In an example, the service request may be communicated at least in part using data formats such as JavaScript Object Notation (JSON), Extensible Markup Language (XML), Binary Encoded JSON (BEJ), and so forth. Although in FIG. 5, the composer application is shown to be within the host device 502, in some examples, the functionality of the composer application 504 may be implemented in another device and/or software application such as, a remote system management device or application coupled to the adapter device 510 via the network 518.

In an example, the service request is indicative of a service associated with a virtual multi-layer network switch to be provided to the host device, such as the host device 112 or 202. Examples of the service include one of data packet processing and encryption, error checking, dynamic routing, link aggregation, multicast group management, network management, deep packet inspection, telemetry analysis, and a combination thereof. In an example, the adapter device is coupled to the host device through a bus interface, such as the bus interface 114 or 208 of the host device. The adapter device includes a bus interface, such as the bus interface 110 or 210, through which an accelerator component, such as the accelerator component 104 or 206, is coupled to the adapter device. In an example, the adapter device may include in-built accelerator components, such as the accelerator components 104' and 206'. In an example, the adapter device may include both in-built accelerator components and externally coupled accelerator components.

In response to receiving the service request, a set of processing tasks associated with the service may be identified, at block 404. In an example, referring to FIG. 5, the composer container 512 may identify a set of processing tasks associated with the service. Depending on the processing operations associated with the requested service, the composer container 512 may identify one or more than one of the set of processing tasks, such as processing operations for one of data packet processing and encryption based on Internet Protocol Security (IPSec), error-checking based on Transmission Control Protocol (TCP) and Internet Protocol version 4 (IPv4) checksum, dynamic routing based on Border Gateway Protocol (BGP) and Open Shortest Path First (OSPF), link aggregation based on Link Aggregation Control Protocol (LACP), multicast group management based on Internet Group Management Protocol (IGMP) and Protocol Independent Multicast (PIM), network management based on Simple Network Management Protocol (SNMP), Virtual Local Area Network (VLAN) tagging and untagging, and a combination thereof.

Each of the processing tasks has a predefined configuration information. The predefined configuration information includes policies for executing each of the set processing tasks in one of the adapter device and the accelerator component, such as in-built accelerator components like 104' and 206' or externally coupled accelerator components like 104 and 206. In an example, the predefined configuration information may also include policies that define which one of an external accelerator component, such as the accelerator component 104, and an in-built accelerator component, such as the accelerator component 104', is to be used executing one or a group of processing tasks. Thus, a processing task or more than one processing tasks may be deployed in the in-built accelerator component, such as accelerator component 104' or the externally coupled accelerator component, such as accelerator component 104, based on the configuration information.

At block 406 it is checked whether a processing task instance corresponding to each of the set of processing tasks is compatible to be executed in one of the adapter device and the accelerator component, based on the predefined configuration information. Each processing task instance is to execute a specific processing task from the set of processing tasks associated with the service. In an example, referring to FIG. 5, the composer container 512 checks compatibility of execution of a processing task instance corresponding to each of the set of processing tasks in one of the adapter device 510 and the accelerator components 516 or 516', based on the predefined configuration information.

Figure 5:
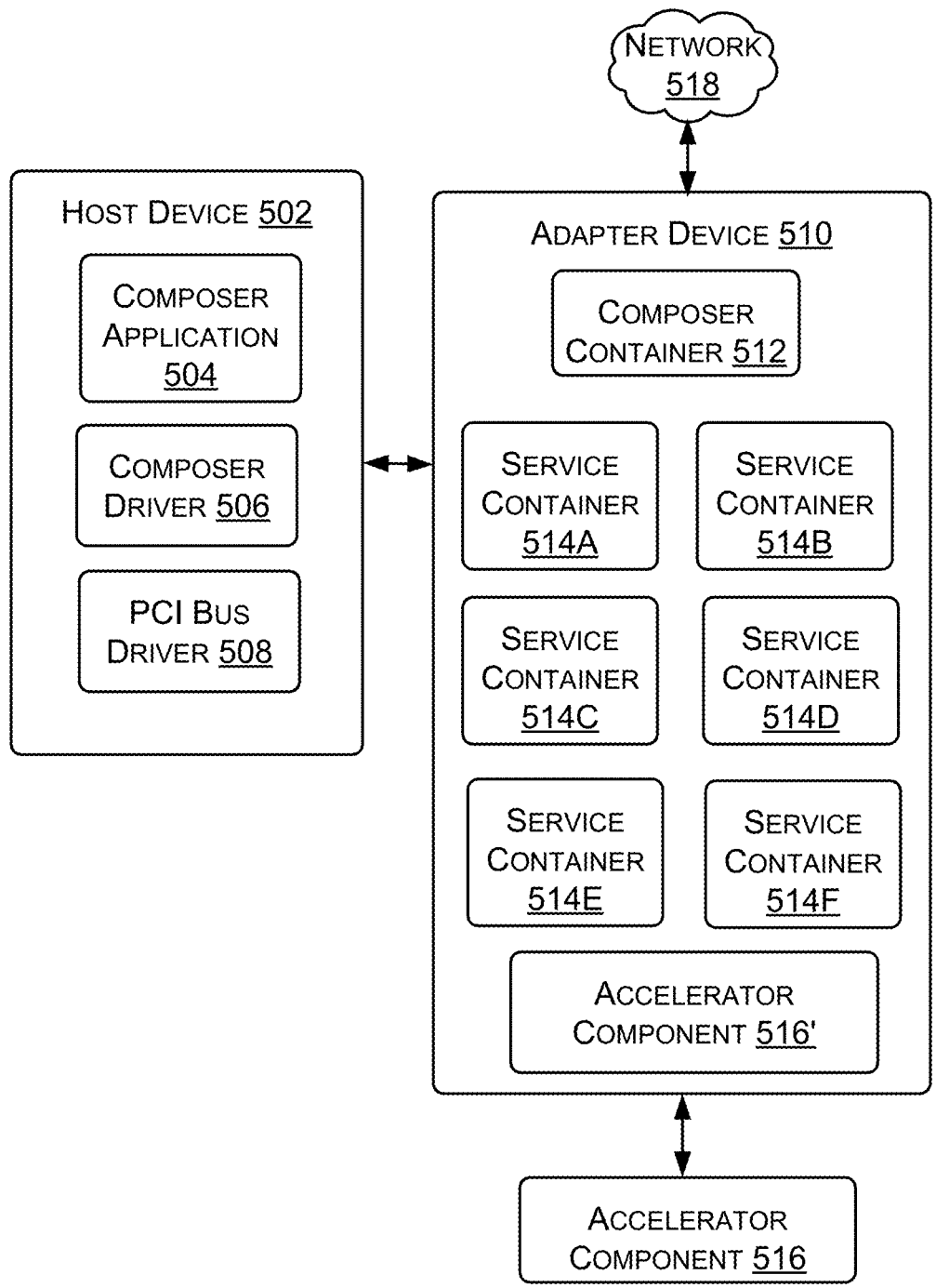
FIG. 5 illustrates a container-based system for deployment of processing tasks, in accordance with an example.

At block 408, one of the adapter device and the accelerator component is selected for deployment of the processing task instance, based on the checked compatibility. In an example, one of the in-built accelerator component, such as accelerator component 104', and the externally coupled accelerator component, such as accelerator component 104, may be selected for deployment of the processing task instance, based on the predefined configuration information. Referring to FIG. 5, the composer container 512 selects the adapter device 510 or the accelerator component(s) 516 or 516' for deployment of the processing task instance based on the checked compatibility according to the predefined configuration information.

In response to selecting the adapter device for deployment of the processing task instance (No' branch from block 410), the processing task instance is deployed in the adapter device at block 412. In an example, referring to FIG. 5, in response to selecting the adapter device 510 for deployment of the processing task instance, the composer container 512 may determine a type and amount of hardware resources of the adapter device 510 that would be required to deploy the processing task instance. The composer container 512 may also determine the available resources of the adapter device 510, such as by subtracting previous allocations to existing containers from the total amount(s) of resources of the adapter device 510. The composer container 510 may also determine whether the requirements of the processing task instance can be supported by the available resources of the adapter device 510. In some implementations, the composer container 512 may maintain one or more stored data structures to track existing allocations of resources to containers, total resources, and so forth.

In response to selecting the accelerator component for deployment of the processing task instance at block 410 (Yes' branch), computing resource requirements of the processing task instance is determined at block 414, based on the predefined configuration information. In an example, referring to FIG. 5, the composer container 512 may determine a type and amount of hardware resources of the accelerator components 516 and 516' that would be required to implement the processing task instance (e.g., a required memory space, a required processing speed, and so forth).

Referring to FIG. 4B, the available computing resources of the accelerator component may be determined at block 416. At block 418, it may be determined whether the computing resource requirements of the processing task instance is supported by the available computing resources of the accelerator component. In an example, referring to FIG. 5, the composer container 512 may determine the available resources of the accelerator component 516 by subtracting previous allocations to existing containers or processing task instances from the total amount(s) of resources of the accelerator component 516. Similarly, the composer container 512 may determine the available resources of the accelerator component 516' integrated in the accelerator component by subtracting previous allocations to existing containers or processing task instances from the total amount(s) of resources of the accelerator component 516'. The composer container 512 may also determine whether the requirements of the processing task instance can be supported by the available resources of the accelerator component 516 or 516'.

In response to determining that the available computing resources of the accelerator component does not support the computing resource requirements of the processing task instance (No' branch from block 418), an error message may be generated to indicate to the user that the processing task instance cannot be deployed on the accelerator component, at block 422. The composer container 512 may generate the error message and transmit the error message to the composer application 504. In response to determining that the available computing resources of the accelerator component supports the computing resource requirements of the processing task instance (Yes' branch from block 418), the processing task instance may be deployed in the accelerator component, at block 420. In an example, when a processing task instance associated with a particular processing task is previously deployed in an accelerator component, the previously deployed processing task instance may be subsequently used for executing the particular processing task, when a current processing task instance associated with the particular processing task is to be deployed in the accelerator component. In another example, a separate processing task instance may be launched corresponding to the current processing task instance in the accelerator component. Referring to FIG. 5, the composer container 512, in response to determining that the available computing resources of the accelerator component 516' supports the computing resource requirements of the processing task instance, deploys the processing task instance in the accelerator component 516'. In response to determining that the computing resources of the external accelerator component 516 supports the computing resource requirements of the processing task instance, the composer container 512 deploys the processing task instance in the external accelerator component 516.

Thus, a processing task instance corresponding to at least one of the set of processing tasks may be deployed in one of the adapter device and the accelerator component(s), based on predefined configuration information of the set of processing tasks. Thus, different processing tasks associated with the service may be executed in a distributed manner, either in the adapter device or in the accelerator component(s). Based on deployment of the processing task instances, a subset of computing resources associated with one of the adapter device and the accelerator component(s) may be allocated to the processing task instance.

In an example, the composer container 512 may control a service container type and other operating characteristics of each deployed service container 514 based on the service request. For example, in some examples, the composer container 512 may specify each service container as one of three service container types, namely a device type, a host type, and a service endpoint type. Such types may determine how service containers are exposed to (or appear to) the host device 502. In an example, the device type of service container may be perceived by the host device 502 as a particular type of peripheral device (e.g., a storage device, a network switch, a network interface card (NIC), and so forth). The host type of service container may be perceived by the host device 502 as a remote or peer computing device (e.g., a server, a desktop, etc.). The service endpoint type of service container may be perceived by the host device 502 as the access point for a particular computing service (e.g., an address for a given web service, a Representational State Transfer (REST) interface, etc.).

In an example, the service container 514A may be deployed as a device type container that is allocated a single CPU core and an amount of network bandwidth, and that provides a virtual NIC to connect the host device 502 to the network 518. In an example, the service container 514B may be deployed as a service endpoint type that is allocated two CPU cores, and that provides a particular web service to the host device 502. In an example, the service container 514C may be deployed as a device type that is allocated one CPU core and two GPU cores, and that provides a network switch service to the host device 502. In an example, the service container 514D may be deployed as a host type that is allocated one CPU core and a cryptographic accelerator unit, and that provides encryption and/or decryption services to the host device 502. In an example, the service container 514E may be deployed as a device type that is allocated one CPU core and seven GPU cores, and that provides a non-volatile memory express (NVMe) storage service to the host device 502. In an example, the service container 514F may be deployed as a device type container that is allocated two CPU cores and five GPU cores, and that provides a storage device with data de-duplication to the host device 502. Further, in some examples, a single service container 514 may provide multiple services.

In an example, the service containers 514 may be maintained in isolation from each other. For example, the service container 514A may not have access to internal data of the service container 514B, and vice-versa. Further, the service container 514C may not have access to communications between the host device 502 and the service container 514D, and vice-versa. In this manner, the data security of various services provided by the adapter device 510 may be improved. Further, the probability that a service container 514 that is configured or implemented incorrectly will affect other service containers 514 may be reduced. Furthermore, such isolation between the service containers 514 may reduce the damage and/or spread of malware that affects a particular service container 514.

In an example, the service containers 514 may access computing resources of device(s) that are external to the adapter device 510, such as accelerator component 516. For example, the service container 514A may be allocated the processing bandwidth of the accelerator component 516, such as a GPU or FPGA device that is coupled to a bus interface of the adapter device 510, such as through a PCI slot of the adapter device 510. In some implementations, the adapter device 510 may include multiple network ports coupled to the network 518. In such examples, a service container 514 may provide aggregation of network traffic to the host device 502. For example, the service container 514A may aggregate network traffic from multiple NVMe storage devices.

Figure 6:
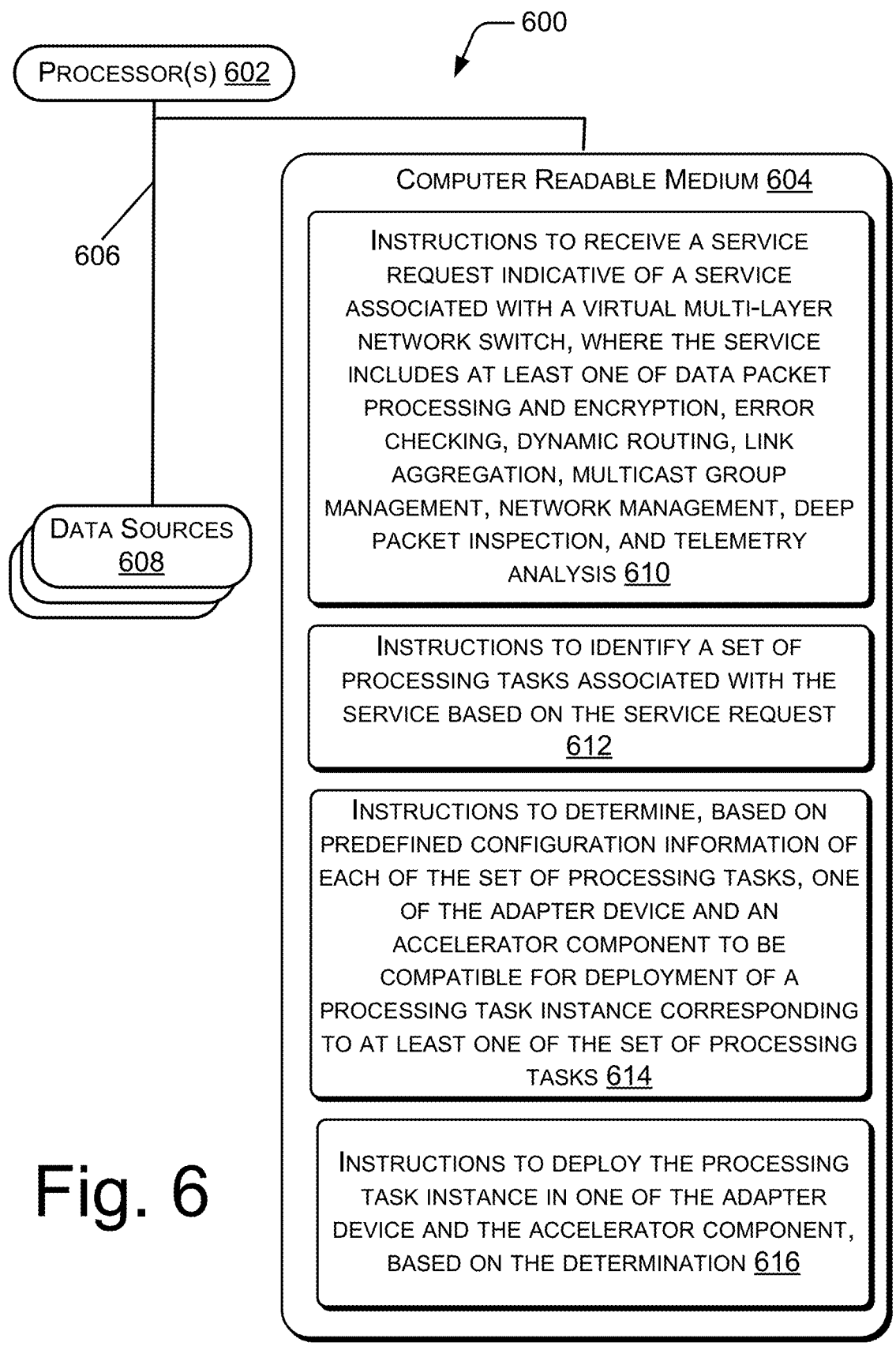
FIG. 6 illustrates a system environment implementing a non-transitory computer readable medium for deployment of processing tasks, in accordance with an example.

FIG. 6 illustrates a system environment 600 implementing a non-transitory computer readable medium for deployment of processing tasks, in accordance with an example. In an example, the system environment 600 includes processor(s) 602 communicatively coupled to a non-transitory computer readable medium 604 through a communication link 606. In an example, the system environment 500 may be an adapter device, such as the adapter device 102 or 204. In an example, the processor(s) 602 may have one or more processing resources for fetching and executing computer-readable instructions from the non-transitory computer readable medium 604.

The non-transitory computer readable medium 604 can be, for example, an internal memory device or an external memory device. In an example implementation, the communication link 606 may be a direct communication link, such as any memory read/write interface.

The processor(s) 602 and the non-transitory computer readable medium 604 may also be communicatively coupled to data sources 608 over the network. The data sources 608 can include, for example, memory of the system, such as the system 100.

In an example, the non-transitory computer readable medium 604 includes a set of computer readable instructions which can be accessed by the processor(s) 602 through the communication link 606 and subsequently executed to perform acts for deploying processing task instances in an adapter device and an accelerator component, such as the accelerator component 104 or 206, coupled to the adapter device or an accelerator component like 104' or 206' in-built in the adapter device.

Referring to FIG. 5, in an example, the non-transitory computer readable medium 604 includes instructions 610 that cause the processor(s) 602 to receive a service request from a host device, such as the host device 112 or 202. Although in FIG. 6, the adapter device receives the service request from the host device, in an example, the service request may be received by the adapter device from another appliance, such as a server, a network switch/router, a virtual machine, etc., which is connected to the network to which the adapter device is connected. Thus, the service request may be received from the host device, to which the adapter device is coupled or may be received over the network. In an example, the service request is indicative of a service associated with a virtual multi-layer network switch to be provided to the host device, such as the host device 112 or 202. In an example, the adapter device is coupled to the host device through a bus interface, such as the bus interface 114 or 208 of the host device. In an example, the adapter device includes a bus interface, such as the bus interface 110 or 210, through which an accelerator component, such as the accelerator component 104 or 206, is coupled to the adapter device. In an example, an accelerator component, such as the accelerator component 104' or 206', may be integrated with the adapter device.

In response to receiving the service request, the non-transitory computer readable medium 604 includes instructions 612 that cause the processor(s) 602 to identify a set of processing tasks associated with the service based on the service request. Examples of the service include one of data packet processing and encryption, error checking, dynamic routing, link aggregation, multicast group management, network management, deep packet inspection, and telemetry analysis, and a combination thereof. Each of the set of processing tasks has a predefined configuration information. The predefined configuration information is indicative of switching and routing behavior of the virtual multi-layer network switch and includes policies for executing each of the set processing tasks in one of the adapter device and the accelerator component. Further, the non-transitory computer readable medium 604 includes instructions 614 to determine, based on predefined configuration information of each of the set of processing tasks, one of the adapter device and the accelerator component to be compatible for deployment of a processing task instance corresponding to at least one of the set of processing tasks. In an example, the non-transitory computer readable medium 604 includes instructions to deploy a containerized application, such as a service container, in the adapter device in response to receiving the service request, where the service container is to provide the service to the host device and each processing task instance is managed by the service container.

In addition, the non-transitory computer readable medium 604 includes instructions 616 to deploy the processing task instance in one of the adapter device and the accelerator component, based on the determination. Thus, one processing task instance or more than one processing task instance may be deployed in in one of the adapter device and the accelerator component. Further, in an example, the non-transitory computer readable medium 604 may include instructions which when executed by the processor(s) 602 may cause the processor(s) 602 to allocate a subset of computing resources associated with one of the adapter device and the accelerator component to the processing task instance, based on deployment of the processing task instance.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
   receiving, by a processor of an adapter device, a service request indicative of a service associated with a virtual multi-layer network switch, the adapter device being coupled to a host device through a first bus interface of the host device;
   identifying, by the processor, a set of processing tasks associated with the service based on the service request;
   deploying, by the processor, a first processing task instance corresponding to a first of the set of processing tasks for execution at the adapter device based on first policies included in first predefined configuration information for executing the first of the set of processing tasks and a second processing task instance corresponding to a second of the set of processing tasks for execution at an accelerator component based on second policies included in second predefined configuration information for executing the second of the set of processing tasks, wherein the adapter device comprises a network interface card (NIC) and the accelerator component comprises a hardware accelerator coupled to the adapter device through a second bus interface of the adapter device, wherein predefined configuration information includes policies for executing the first and second processing tasks in either the adapter device or the accelerator component.

2. The method as claimed in claim 1, wherein the predefined configuration information includes reporting based on an Internet Control Message Protocol (ICMP).

3. The method as claimed in claim 1, wherein deploying a processing task instance comprises:
   checking whether the processing task instance is compatible to be executed in the adapter device or the accelerator component, based on predefined configuration information; and
   selecting one of the adapter device or the accelerator component for deployment of the processing task instance, based on the checked compatibility.

4. The method as claimed in claim 1, wherein each processing task instance is to execute a specific processing task from the set of processing tasks associated with the service.

5. The method as claimed in claim 1, further comprising, in response to receiving the service request, deploying a service container in the adapter device, wherein the service container is to provide the service, wherein each processing task instance is managed by the service container.

6. The method as claimed in claim 1, further comprising:
   determining computing resource requirements of the processing task instance based on the predefined configuration information;
   determining available computing resources of the accelerator component; and
   in response to determining that the available computing resources of the accelerator component supports the computing resource requirements of the processing task instance, deploying the processing task instance in the accelerator component.

7. The method as claimed in claim 1, wherein the set of processing tasks include processing operations for one of data packet processing and encryption based on Internet Protocol Security (IPSec), error-checking based on Transmission Control Protocol (TCP) and Internet Protocol version 4 (IPv4) checksum, dynamic routing based on Border Gateway Protocol (BGP) and Open Shortest Path First (OSPF), link aggregation based on Link Aggregation Control Protocol (LACP), multicast group management based on Internet Group Management Protocol (IGMP) and Protocol Independent Multicast (PIM), network management based on Simple Network Management Protocol (SNMP), Virtual Local Area Network (VLAN) tagging and un-tagging, and a combination thereof.

8. The method as claimed in claim 1, wherein the service includes at least one of data packet processing and encryption, error checking, dynamic routing, link aggregation, multicast group management, network management, deep packet inspection, and telemetry analysis.

9. A system comprising:
   an adapter device coupled to a host device through a first bus interface of the host device, wherein the adapter device comprises a network interface card (NIC) including a second bus interface;
   a hardware accelerator component coupled to the adapter device through the second bus interface, wherein the adapter device comprises:
   a processor;
   a memory coupled to the processor, the memory storing instructions executable by the processor to:
   receive a service request indicative of a service associated with a virtual multi-layer network switch;

identify a set of processing tasks associated with the service based on the service request;

deploy a first processing task instance corresponding to a first of the set of processing tasks for execution at the adapter device based on first policies included in first predefined configuration information for executing the first of the set of processing tasks and a second processing task instance corresponding to a second of the set of processing tasks for execution at an accelerator component based on second policies included in second predefined configuration information for executing the second of the set of processing tasks, wherein the adapter device comprises a network interface card (NIC) and the accelerator component comprises a hardware accelerator coupled to the adapter device through a second bus interface of the adapter device, wherein predefined configuration information includes policies for executing the first and second processing tasks in either the adapter device and the accelerator component; and allocate a subset of computing resources associated with one of the adapter device and the hardware accelerator component, based on deployment of at least one of the first processing task instance and the second processing task instance.

10. The system as claimed in claim 9, wherein the processor is further to:

check whether the processing task instance is compatible to be executed in one of the adapter device and the hardware accelerator component, based on the predefined configuration information; and select one of the adapter device and the hardware accelerator component for deployment of the processing task instance, based on the checked compatibility.

11. The system as claimed in claim 9, wherein each processing task instance is to execute a specific processing task from the set of processing tasks associated with the service.

12. The system as claimed in claim 9, wherein, in response to the service request being received, the processor is to deploy a service container in the adapter device, wherein the service container is to provide the service, wherein each processing task instance is managed by the service container.

13. The system as claimed in claim 9, wherein the processor is further to:

determine computing resource requirements of the processing task instance based on the predefined configuration information;

determine available computing resources of the hardware accelerator component; and in response to determining that the available computing resources of the hardware accelerator component supports the computing resource requirements of the processing task instance, deploy the processing task instance in the hardware accelerator component.

14. The system as claimed in claim 9, wherein the set of processing tasks include processing operations for one of data packet processing and encryption based on Internet Protocol Security (IPSec), error-checking based on Transmission Control Protocol (TCP) and Internet Protocol version 4 (IPv4) checksum, dynamic routing based on Border Gateway Protocol (BGP) and Open Shortest Path First (OSPF), link aggregation based on Link Aggregation Control Protocol (LACP), multicast group management based on Internet Group Management Protocol (IGMP) and Protocol Independent Multicast (PIM), network management based on Simple Network Management Protocol (SNMP), Virtual Local Area Network (VLAN) tagging and un-tagging, and a combination thereof.

15. The system as claimed in claim 9, wherein the configuration information specifies a hardware component that is suited for execution of processing.

16. The system as claimed in claim 9, wherein the hardware accelerator component coupled to the adapter device is contained within a housing of the adapter device.

17. The system as claimed in claim 9, wherein the hardware accelerator component is one of a Graphics Processing Unit (GPU) device, a Field Programmable Gated Array (FPGA) device, and an Application Specific Integrated Circuit (ASIC) device.

18. A non-transitory computer-readable medium comprising computer-readable instructions that upon execution cause a processor of an adapter device to:

receive a service request indicative of a service associated with a virtual multi-layer network switch, wherein the adapter device is coupled to a host device through a first bus interface of the host device;

identify a set of processing tasks associated with the service based on the service request;

determine, based on predefined configuration information of the set of processing tasks, one of the adapter device and an accelerator component to be compatible for deployment of a processing task instance corresponding to at least one of the set of processing tasks, wherein the accelerator component is at least one of integrated with the adapter device and coupled to the adapter device through a second bus interface of the adapter device, wherein the adapter device comprises a network interface card (NIC) and the accelerator component comprises a hardware accelerator; and deploy a first processing task instance corresponding to a first of the set of processing tasks for execution at the adapter device based on first policies included in first predefined configuration information for executing the first of the set of processing tasks and a second processing task instance corresponding to a second of the set of processing tasks for execution at an accelerator component based on second policies included in second predefined configuration information for executing the second of the set of processing tasks, wherein the adapter device comprises a network interface card (NIC) and the accelerator component comprises a hardware accelerator coupled to the adapter device through a second bus interface of the adapter device, wherein predefined configuration information includes policies for executing the first and second processing tasks in either the adapter device or the accelerator component.

19. The non-transitory computer-readable medium as claimed in claim 18, wherein the predefined configuration information is indicative of switching and routing behavior of the virtual multi-layer network switch and includes policies for executing each of the set processing tasks in one of the adapter device and the accelerator component.

20. The non-transitory computer-readable medium as claimed in claim 18, wherein the computer-readable instructions upon execution cause the processor to:

deploy a service container in the adapter device in response to receiving the service request, wherein the service container is to provide the service to the host device, wherein each processing task instance is managed by the service container.

\* \* \* \* \*